United States Patent
Lin et al.

(10) Patent No.: US 10,382,163 B2
(45) Date of Patent: Aug. 13, 2019

(54) DEVICE AND METHOD FOR DETERMINING MODULATION AND CODING SCHEME BASED ON CHANNEL CAPACITY

(71) Applicant: Realtek Semiconductor Corp., HsinChu (TW)

(72) Inventors: Chuan-Hu Lin, Changhua County (TW); Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 15/697,441

(22) Filed: Sep. 6, 2017

(65) Prior Publication Data
US 2018/0205489 A1      Jul. 19, 2018

(30) Foreign Application Priority Data

Jan. 16, 2017 (TW) .............................. 106101336 A

(51) Int. Cl.
| H04L 1/00 | (2006.01) |
| H04L 25/02 | (2006.01) |
| H04B 7/0426 | (2017.01) |

(52) U.S. Cl.
CPC ......... *H04L 1/0015* (2013.01); *H04B 7/0426* (2013.01); *H04L 1/0003* (2013.01); *H04L 1/0009* (2013.01); *H04L 25/0224* (2013.01)

(58) Field of Classification Search
CPC .. H04L 1/0015; H04L 25/0224; H04B 7/0426
See application file for complete search history.

(56) References Cited

U.S. PATENT DOCUMENTS

| 2010/0232525 A1* | 9/2010 | Xia | H04B 7/0626 375/259 |
| 2011/0080965 A1* | 4/2011 | Liu | H04L 25/0224 375/260 |
| 2011/0170623 A1* | 7/2011 | Park | H04L 25/0204 375/260 |
| 2013/0064276 A1* | 3/2013 | Kim | H04B 7/063 375/219 |
| 2013/0286949 A1* | 10/2013 | Tomeba | H04B 7/0452 370/328 |

* cited by examiner

*Primary Examiner* — Lakeram Jangbahadur
(74) *Attorney, Agent, or Firm* — Winston Hsu

(57) ABSTRACT

A receiving device comprises a channel estimation unit, for generating a plurality of channel estimates according to a plurality of reference signals; an eigenvalue computation unit, coupled to the channel estimation unit, for generating at least one eigenvalue corresponding to the plurality of channel estimates according to the plurality of channel estimates; a channel compensation unit, coupled to the eigenvalue computation unit, for generating a correlation compensation value for compensating the plurality of channels according to the at least one eigenvalue; a channel capacity computation unit, coupled to the eigenvalue computation unit and the channel compensation unit, for generating a channel capacity according to the at least one eigenvalue and the correlation compensation value; and a selection unit, coupled to the channel capacity computation unit, for determining a modulation and coding scheme (MCS) according to the channel capacity.

7 Claims, 4 Drawing Sheets

US 10,382,163 B2

DEVICE AND METHOD FOR DETERMINING MODULATION AND CODING SCHEME BASED ON CHANNEL CAPACITY

BACKGROUND OF THE INVENTION

1. Field of the Invention

The present invention relates to a device and a method used in a communication system, and more particularly, to a device and a method of determining modulation and coding scheme.

2. Description of the Prior Art

In a wireless communication system, a receiver selects a better modulation and coding scheme (MCS) and returns the selected MCS to a transmitter to improve throughput of the receiver, because a channel in the wireless communication system is time-varying. After receiving the MCS from the receiver, the transmitter can transmit information to the receiver according to the received MCS.

In general, the receiver uses Exponential Effective SINR Mapping (EESM) to select the MCS. However, EESM is suitable for linear detectors, and is difficult for being applied to multiple-input multiple-output (MIMO) nonlinear detectors.

Thus, how to select the MCS accurately when using the nonlinear detectors is an important problem to be solved.

SUMMARY OF THE INVENTION

The present invention therefore provides a receiving device and a receiving method capable being applied to the receiver having the linear detector or the nonlinear detector for determining the MSC to solve the abovementioned problem.

A receiving device comprises a channel estimation unit, for receiving a plurality of reference signals to generate a plurality of channel estimates according to the plurality of reference signals; an eigenvalue computation unit, coupled to the channel estimation unit, for generating at least one eigenvalue corresponding to the plurality of channel estimates according to the plurality of channel estimates; a channel compensation unit, coupled to the eigenvalue computation unit, for generating a correlation compensation value for compensating the plurality of channel estimates according to the at least one eigenvalue; a channel capacity computation unit, coupled to the eigenvalue computation unit and the channel compensation unit, for generating a channel capacity according to the at least one eigenvalue and the correlation compensation value; and a selection unit, coupled to the channel capacity computation unit, for determining a modulation and coding scheme (MCS) according to the channel capacity.

A receiving method for a receiving device comprises receiving a plurality of reference signals to generate a plurality of channel estimates according to the plurality of reference signals; generating at least one eigenvalue corresponding to the plurality of channel estimates according to the plurality of channel estimates; generating a correlation compensation value for compensating the plurality of channel estimates according to the at least one eigenvalue; generating a channel capacity according to the at least one eigenvalue and the correlation compensation value; and determining a MCS according to the channel capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
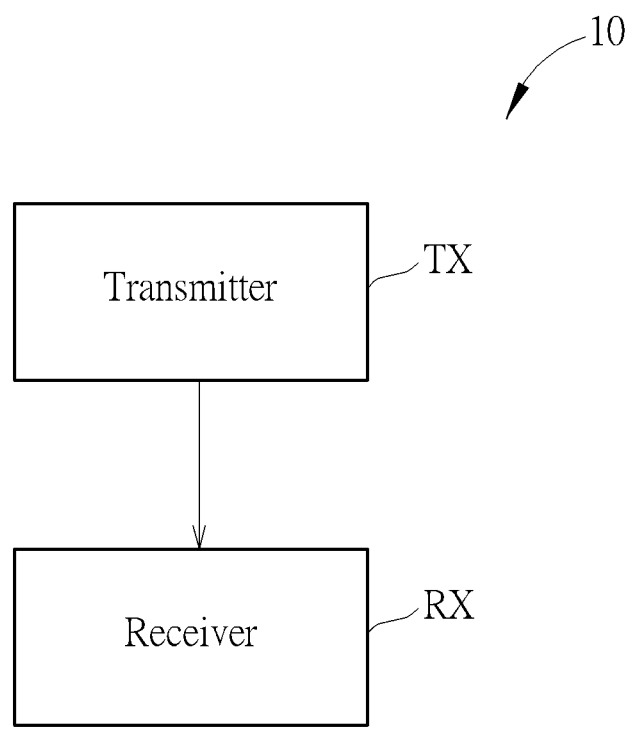
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system, a Long Term Evolution-advanced (LTE-A) system. The DVB system may include a DVB-Terrestrial (DVB-T) system and a DVB-T2 system. In addition, the transmitter TX and the receiver RX may be installed in a mobile phone, a laptop, a tablet computer, an electronic book, a portable computer system, etc.

Figure 2:
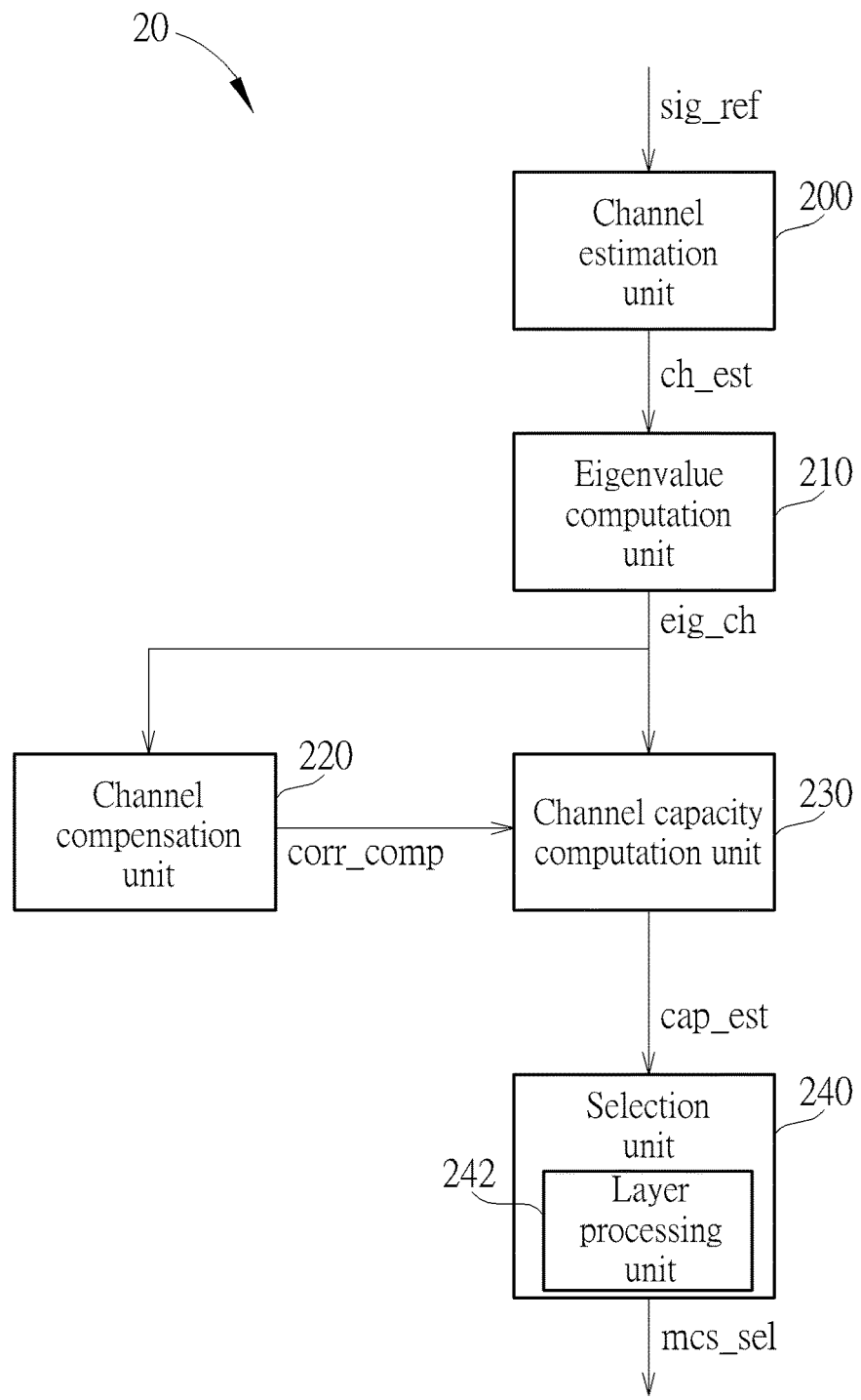
FIG. 2 is a schematic diagram of a receiving device according to an example of the present invention.

FIG. 2 is a schematic diagram of a receiving device 20 according to an example of the present invention. The receiving device 20 may be utilized in the receiver RX of FIG. 1 for determining (e.g., selecting) the MCS. The receiving device 20 includes a channel estimation unit 200, an eigenvalue computation unit 210, a channel compensation unit 220, a channel capacity computation unit 230 and a selection unit 240. In detail, after the receiving device 20 receives a plurality of reference signals sig_ref, the channel estimation unit 200 may generate a plurality of channel estimates ch_est (e.g., performing the channel estimation) according to the plurality of reference signals sig_ref, wherein the plurality of reference signals sig_ref may be known signals for estimating a channel, such as pilot signals, preambles, etc., but is not limited herein. The eigenvalue computation unit 210 is coupled to the channel estimation unit 200, for generating at least one eigenvalue eig_ch corresponding to the plurality of channel estimates ch_est according to the plurality of channel estimates ch_est. The channel compensation unit 220 is coupled to the eigenvalue computation unit 210, for generating a correlation compensation value corr_comp of the plurality of channel estimates ch_est according to the at least one eigenvalue eig_ch. The channel capacity computation unit 230 is coupled to the eigenvalue computation unit 210 and the channel compensation unit 220, for generating a channel capacity cap_est according to the at least one eigenvalue eig_ch and the correlation compensation value corr_comp. The selection unit 240 is coupled to the channel capacity computation unit 230, for determining a modulation and coding scheme (MCS) mcs_sel according to the channel capacity cap_est.

That is, the channel changes with time. The plurality of channel estimates ch_est may have a high correlation, e.g., due to the correlation caused by multiple antennas. The channel capacity computation unit 230 may use the correlation compensation value corr_comp when estimating the channel capacity cap_est, such that the channel capacity cap_est reflects the negative effect caused by the correlation. Thus, the selection unit 240 can determine the MCS mcs_sel that is suitable for the current channel condition according to a more accurate channel capacity, to improve a throughput of the receiver RX. In addition, the receiving device 20 may be applied to a linear detector or a nonlinear detector, and the problem that the Exponential Effective noise and interference ratio (SINR) Mapping (EESM) can only be applied to the linear detector is solved.

In one example, the selection unit 240 may generate a bit efficiency according to the channel capacity cap_est, and the selection unit 240 may determine the MCS according to the bit efficiency. Further, the selecting unit 240 may determine the MCS according to the bit efficiency such that a block error rate (BLER) of the receiving device 20 satisfies a predetermined BLER (e.g., 10%). In one example, the eigenvalue computation unit 210 may generate the at least one eigenvector eig_ch corresponding to the plurality of channel estimates ch_est according to Singular Value Decomposition (SVD). That is, the eigenvalue computation unit 210 uses the SVD for calculating the at least one eigenvalue eig_ch to reduce the complexity (i.e., power consumption) of calculating the at least one eigenvalue eig_ch.

In one example, the selection unit 240 further includes a layer processing unit 242 (coupled to the channel capacity computation unit 230) for dividing the channel capacity cap_est to generate a plurality of channel capacities corresponding to a plurality of layers. Further, the layer processing unit 242 may divide the channel capacity cap_est according to the following methods: dividing the channel capacity cap_est equally or dividing the channel capacity cap_est according to a plurality of power levels of the plurality of layers. That is, when the transmitter TX uses multiple-input multiple-output (MIMO), the data transmission is transmitted via multiple layers, i.e., the data transmission is allocated to multiple streams, and the streams may experience different channels, respectively. In the present example, the layer processing unit 242 calculates the channel capacities and determines the corresponding MCSs for the channel capacities (i.e., layers) to improve the throughput. The layer processing unit 242 may divide the channel capacity cap_est in various ways. For example, the layer processing unit 242 may divide the channel capacity cap_est equally, i.e., the channel capacity allocated to each layer is the same. This simple allocation may reduce the complexity of the receiving device 20. In another example, the layer processing unit 242 may divide the channel capacity cap_est according to the plurality of power levels of the plurality of layers. This allocation can further improve the throughput.

In one example, the channel compensation unit 220 may generate a condition number of the plurality of channel estimates ch_est according to the at least one eigenvalue eig_ch, and the channel compensation unit 220 generates the correlation correction value corr_comp according to the condition number. That is, the channel compensation unit 220 may obtain the correlation correction value corr_comp by using the condition number.

The following example is used for illustrating how the eigenvalue computation unit 210 determines the at least one eigenvalue eig_ch according to the channel estimates ch_est. First, the eigenvalue computation unit 210 calculates a M×M covariance matrix $R_i$ of the channel as follows:

$$R_i = \frac{1}{K} \sum_{k \in RB_i} H_k H_k^H \qquad \text{(Eq. 1)}$$

where $H_k$ is a M×N (estimated) channel matrix with subcarrier index k, M is the number of antennas of the receiver, N is the number of antennas of the transmitter, and $(\ )^H$ is a conjugate transpose. $RB_i$ is a metric unit, which may be a single subcarrier or a resource block (RB) as specified by a LTE system. Taking that the metric unit is a RB as an example, i=1, 2, ..., $N_{RB}^{DL}$, $N_{RB}^{DL}$ is the number of RBs in the downlink (DL), and K is the number of subcarriers used in the metric unit. Then, the eigenvalue computation unit 210 calculates the eigenvalues of the covariance matrix $R_i$. For example, the at least one eigenvalue eig_ch can be obtained by using the SVD in the equation (Eq. 2):

$$R_i = U_i S_i V_k^H \qquad \text{(Eq. 2)}$$

where $U_i$ is a M×M unitary matrix, $V_i$ is a M×M unitary matrix and $S_i$ is a M×M diagonal matrix, $S_i$=diag($\lambda_{i,0}$, $\lambda_{i,1}$, ..., $\lambda_{i,M-1}$), $\lambda_{i,0} \geq \lambda_{i,1} \geq ... \geq \lambda_{i,M-1}$, wherein $\lambda_{i,m}$, m=0, 1, ..., M−1 are singular values (i.e., eigenvalues) of the covariance matrix $R_i$.

The methods for the channel capacity computation unit 230 to calculate a channel capacity $C_i$ by using eigenvalues according to transmission layer can be divided into two cases.

The first case is a single layer: the transmission mode such as LTE TM1, TM2 or TM4 Rank 1. The channel capacity computation unit 230 may calculate the channel capacity $C_i$ according to the eigenvalues $\lambda_{i,0}, \lambda_{i,1}, ..., \lambda_{i,M-1}$ as follows:

$$C_i = \log_2\left(1 + \frac{\lambda_i}{\delta_n^2}\right), \lambda_i = \sum_{m=0}^{M-1} \lambda_{i,m} \qquad \text{(Eq. 3)}$$

where $\delta_n^2$ is a power of the noise. In the present example, the channel compensation unit 220 may be omitted or disabled.

The second case is multiple layers: the transmission mode such as LTE TM3 or TM4 Rank 2. The channel capacity computation unit 230 may calculate the channel capacity $C_i$ according to the eigenvalues $\lambda_{i,0}, \lambda_{i,1}, ..., \lambda_{i,M-1}$ and a correlation compensation value $\varepsilon_i$ as follows:

$$C_i = \sum_{m=0}^{M-1} \log_2\left(1 + \frac{1}{\varepsilon_i} \frac{\lambda_{i,m}}{\delta_n^2}\right) \qquad \text{(Eq. 4)}$$

The method for obtaining the correlation correction value $\varepsilon_i$ is described in detail as follows. The channel compensation unit 220 may first calculate a condition number $\kappa_i$ according to the eigenvalues $\lambda_{i,0}, \lambda_{i,1}, ..., \lambda_{i,M-1}$ as follows:

$$\kappa_i = 10 \cdot \log_{10}\left(\frac{\lambda_{i,0}}{\lambda_{i,M-1}}\right) \quad \text{(Eq. 5)}$$

Then, the channel compensation unit 220 calculates the correlation correction value $\varepsilon_i$ according to the condition number $\kappa_i$ as follows:

$$\varepsilon_i = \frac{\varepsilon_i'}{\alpha}, \quad \text{(Eq. 6)}$$

$$\varepsilon_i' = \alpha_L \max(0, \kappa_i) + \alpha_M \max(0, \kappa_i - 10) + \alpha_H \max(0, \kappa_i - 20)$$

In one example, the parameters may be set as follows: $\alpha_L = 1$, $\alpha_M = 2$, $\alpha_H = 4$, $\alpha = 32$.

In the case of the single layer, the selection unit 240 selects a MCS according to the channel capacity $C_i$. In the case of the multiple layers, the selection unit 240 selects MCSs (the same or different) according to the channel conditions of the respective layers. The following examples of two layers are used for illustrating the allocation of the channel capacities.

The first example: the layer processing unit 242 may distribute the channel capacity equally to two layers. In this case, the receiving device only needs to report the MCS of a layer, because the MCSs of the two layers are the same. The layer processing unit 242 may calculate the channel capacities as follow:

$$C_{0,i} = C_{1,i} = \frac{1}{2}C_i \quad \text{(Eq. 7)}$$

where $C_{0,i}$ and $C_{1,i}$ are the channel capacities of the first layer and the second layer, respectively.

The second example: the layer processing unit 242 calculates the channel capacities of the two layers, respectively. In this case, the receiving device needs to report the MCS of each layer. As an example of the LTE TM4 Rank 2, after expressing a channel matrix as $H_k = [H_k^0 \ H_k^1]$, the layer processing unit 242 may calculate the channel capacities by calculating the power level of each layer as follows:

$$p_{0,i} = \frac{1}{K} \sum_{k \in RB_i} \|H_k^0\|^2, \ p_{1,i} = \frac{1}{K} \sum_{k \in RB_i} \|H_k^1\|^2 \quad \text{(Eq. 8)}$$

If $p_{0,i} \geq p_{1,i}$, the layer processing unit 242 may obtain the channel capacities as follows:

$$C_{0,i} = \frac{\mu_i}{1+\mu_i}C_i, \ C_{1,i} = \frac{1}{1+\mu_i}C_i, \quad \text{(Eq. 9)}$$

$$\text{where } \mu_i = \log_2\left(1 + \frac{p_{0,i}}{p_{1,i}}\right)$$

On the contrary, if $p_{0,i} < p_{1,i}$, the layer processing unit 242 may obtain the channel capacities as follows:

$$C_{0,i} = \frac{1}{1+\mu_i}C_i, \ C_{1,i} = \frac{\mu_i}{1+\mu_i}C_i, \quad \text{(Eq. 10)}$$

$$\text{where } \mu_i = \log_2\left(1 + \frac{p_{1,i}}{p_{0,i}}\right)$$

After obtaining the channel capacities as mentioned above, the selection unit 240 may determine the MCSs. The following example is used for illustrating how the selection unit 240 determines the MCSs according to the channel capacities. The selection unit 240 first calculates the average of the channel capacities of each layer as follows:

$$C_l = \frac{1}{N_{RB}^{DL}} \sum_{i=0}^{N_{RB}^{DL}-1} C_{l,i} \quad \text{(Eq. 11)}$$

where l is a layer index. Then, the selection unit 240 may convert the channel capacity $C_l$ into a bit efficiency $C_l' = f_c(a, C_l)$ by using a transfer function $f_c(\ )$ corresponding to a system BLER (e.g., 10%) wherein a is a set of coefficients corresponding to the single layer or the multiple layers. The selection unit 240 may compare $C_l'$ with predetermined bit efficiencies $y_n$, n=1, 2, ..., 15 to select a channel quality index $n_l$ corresponding to the bit efficiency as follows:

$$n_l = \min_{n=0,\ldots,15} \{C_l' - y_n | C_l' \geq y_n\} \quad \text{(Eq. 12)}$$

Thus, the receiving device may transmit the channel quality index $n_l$ to the transmitter such that the transmitter may know the better MCS according to the channel quality index $n_l$.

Figure 3:
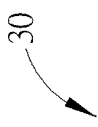
FIG. 3 is a schematic diagram of a correspondence table of channel quality indices and bit efficiencies according to an example of the present invention.

FIG. 3 is a schematic diagram of a correspondence table 30 of channel quality indices and bit efficiencies according to an example of the present invention. FIG. 3 illustrates correspondences between different channel quality indices, MCSs, modulations, bit rates and bit efficiencies. According to the previous description, if the channel capacity estimated by the receiver RX is converted to a bit efficiency of 3.8 according to a transfer function, the receiving device 20 may derive a corresponding bit efficiency of 3.3223 according to the correspondence table 30, and report the channel quality index "11" to the transmitter TX to notify the transmitter TX for using the MCS "21". In other words, the selection unit 240 determines the MCS according to the bit efficiency such that a BLER of the receiving device 20 satisfies a predetermined BLER (e.g., 10%). Of course, the transfer function $f_c(\ )$ should be changed correspondingly, when the required BLER of the system is changed. In other words, the transfer function $f_c(\ )$ is dependent on the BLER requirement.

It should be noted that there are various forms of $f_c(\ )$, as long as the channel capacity $C_l$ can be converted into the bit efficiency $C_l'$ properly. The following example illustrates a method of determining the quadratic polynomial $f_c(\alpha, x) = a_2 x^2 + a_1 x + a_0$.

1. Select a channel quality index j for randomly generating a fading channel to perform system simulation of a BLER.

2. Calculate the signal-to-noise ratio (SNR) needed for a BLER of 10%, and input the SNR into the calculation of the channel capacities to obtain $c_{j,n}$.

3. Repeat Steps 1 and 2 for N times, and calculate the average channel capacities of N fading channels as follows:

$$X_j = \frac{1}{N} \sum_{n=1}^{N} (c_{j,n}) \quad \text{(Eq. 13)}$$

4. Repeat Steps 1, 2 and 3, until the average channel capacities $X_j$, j=1, 2, ..., 15 of all channel quality indices are obtained.

5. Define $X=[X_1\ X_2\ ...\ X_{15}]$ as a vector of the average channel capacities of the channel quality indices, and $Y=[y_1 y_2 ... y_{15}]=[0.1523\ 0.2344\ ...\ 5.5547]$ as a vector of the bit efficiencies of the channel quality indices. In one example, a polynomial $f_c(\alpha,C_l)$ may be obtained by using a least square error criterion as follows:

$$J(X,Y)=\min\{|Y-f_c(\alpha,X)|^2\} \quad (Eq.14)$$

In the case of the single layer, $[a_2\ a_1\ a_0]=[0.014\ 0.7052\ -0.0609]$ may be obtained approximately, and in the case of the multiple layers, $[a_2\ a_1\ a_0]=[0.212\ 0.6407 0.0843]$ may be obtained approximately.

Figure 4:
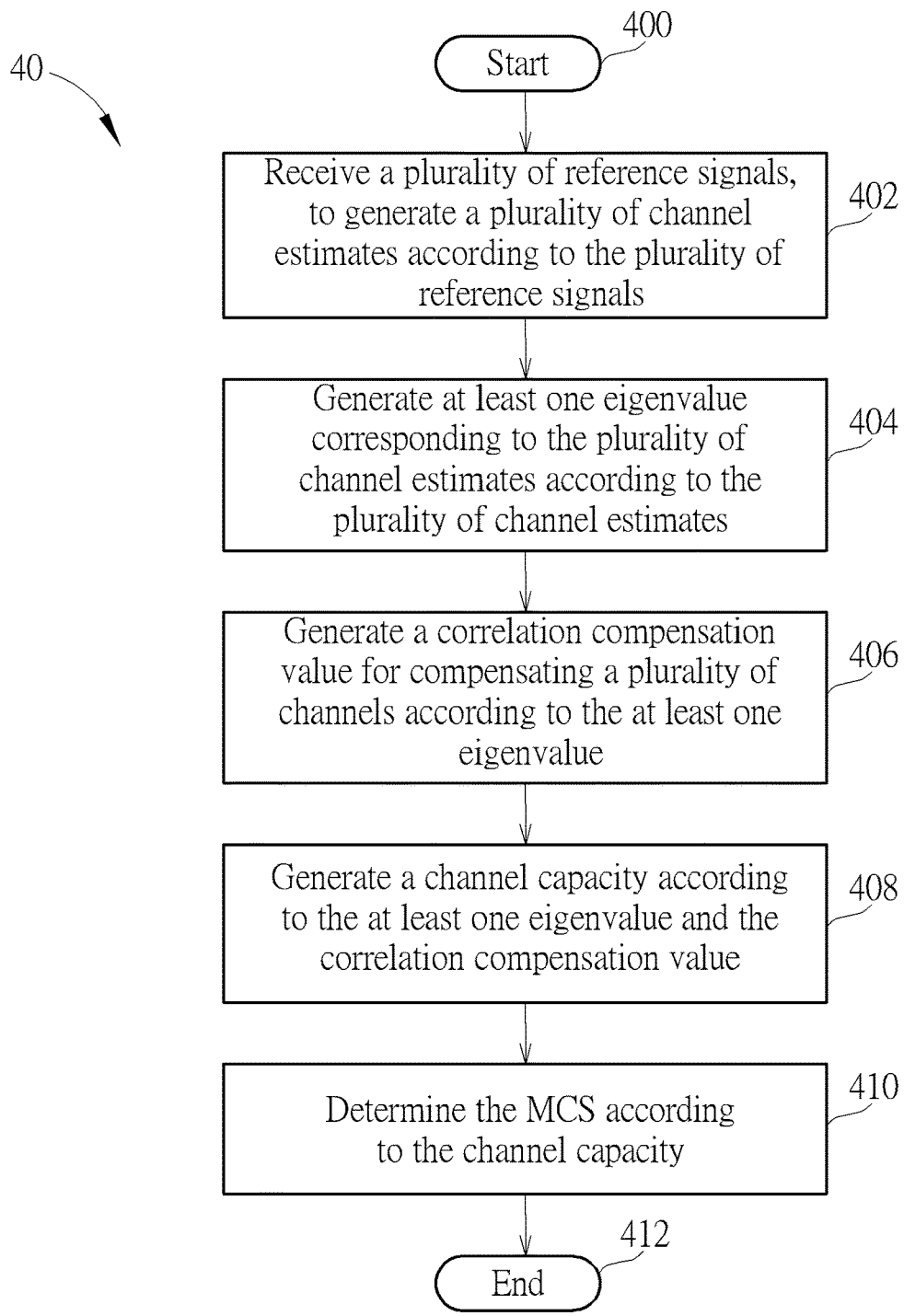
FIG. 4 is a flowchart of a process according to an example of the present invention.

Operations of the receiving device 20 in the above examples can be summarized into a process 40 shown in FIG. 4. The process 40 is utilized in the receiver RX, and includes the following steps:

Step 400: Start.

Step 402: Receive a plurality of reference signals, to generate a plurality of channel estimates according to the plurality of reference signals.

Step 404: Generate at least one eigenvalue corresponding to the plurality of channel estimates according to the plurality of channel estimates.

Step 406: Generate a correlation compensation value for compensating a plurality of channels according to the at least one eigenvalue.

Step 408: Generate a channel capacity according to the at least one eigenvalue and the correlation compensation value.

Step 410: Determine the MCS according to the channel capacity.

Step 412: End.

The process 40 is used for illustrating the operations of the receiving device 20. Detailed description and variations of the process 40 can be referred to the previous description, and is not narrated herein.

It should be noted that realizations of the receiving device 20 (including the channel estimation unit 200, the eigenvalue computation unit 210, the channel compensation unit 220, the channel capacity computation unit 230 and the selection unit 240) are various. For example, the units mentioned above may be integrated into one or more units. In addition, the receiving device 20 may be realized by hardware (e.g., circuit), software, firmware (known as a combination of a hardware device, computer instructions and data that reside as read-only software on the hardware device), an electronic system or a combination of the devices mentioned above, but is not limited herein.

To sum up, the present invention provides a device and a method of determining (e.g., selecting) a MCS capable being applied to a linear detector or a nonlinear detector, for determining a MCS suitable for a current channel condition according to a more accurate channel capacity, to improve system throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving device, comprising:
a channel estimation circuit, for receiving a plurality of reference signals to generate a plurality of channel estimates according to the plurality of reference signals;
an eigenvalue computation circuit, coupled to the channel estimation circuit, for generating at least one eigenvalue corresponding to the plurality of channel estimates according to the plurality of channel estimates;
a channel compensation circuit, coupled to the eigenvalue computation circuit, for generating a correlation compensation value for compensating the plurality of channels according to the at least one eigenvalue received from the eigenvalue computation circuit;
a channel capacity computation circuit, coupled to the eigenvalue computation circuit and the channel compensation circuit, for generating a channel capacity according to the at least one eigenvalue received from the eigenvalue computation circuit and the correlation compensation value received from the channel compensation circuit; and
a selection circuit, coupled to the channel capacity computation circuit, for determining a modulation and coding scheme (MCS) according to the channel capacity;
wherein the selection circuit generates a bit efficiency according to the channel capacity, and the selection circuit determines the MCS according to the bit efficiency such that a block error rate (BLER) of the receiving device satisfies a predetermined BLER.

2. The receiving device of claim 1, wherein the eigenvalue computation circuit generates the at least one eigenvalue corresponding to the plurality of channel estimates according to a singular value decomposition (SVD).

3. The receiving device of claim 1, further comprising:
a layer processing circuit, coupled to the channel capacity computation circuit, for dividing the channel capacity to generate a plurality of channel capacities corresponding to a plurality of layers.

4. The receiving device of claim 3, wherein the layer processing circuit divides the channel capacity according to the following methods: dividing the channel capacity equally or dividing the channel capacity according to a plurality of power levels of the plurality of layers.

5. The receiving device of claim 1, wherein the channel compensation circuit generates a condition number of the plurality of channels estimates according to the at least one eigenvalue, and the channel compensation circuit generates the correlation compensation value according to the condition number.

6. A receiving method for a receiving device, comprising:
receiving a plurality of reference signals to generate a plurality of channel estimates according to the plurality of reference signals;
generating at least one eigenvalue corresponding to the plurality of channel estimates according to the plurality of channel estimates;
generating a correlation compensation value for compensating the plurality of channels according to the at least one eigenvalue;
generating a channel capacity according to the at least one eigenvalue and the correlation compensation value; and
determining a modulation and coding scheme (MCS) according to the channel capacity;
wherein the step of determining the MCS comprises:
generating a bit efficiency according to the channel capacity; and determining the MCS according to the bit efficiency such that a block error rate (BLER) of the receiving device satisfies a predetermined BLER.

7. The receiving method of claim 6, wherein the step of determining the MCS comprises:
   generating a condition number of the plurality of channels estimates according to the at least one eigenvalue; and
   generating the correlation compensation value according to the condition number.

\* \* \* \* \*